US006563527B1

(12) United States Patent
Shimoda et al.

(10) Patent No.: US 6,563,527 B1
(45) Date of Patent: May 13, 2003

(54) INFORMATION RECORDING METHOD AND INFORMATION REPRODUCING METHOD, RECORDING MEDIUM FOR USE IN THE METHODS, AND INFORMATION RECORDING APPARATUS AND INFORMATION REPRODUCING APPARATUS

(75) Inventors: Tatsuya Shimoda, Nagano-ken (JP); Satoru Miyashita, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/445,835

(22) PCT Filed: Apr. 1, 1999

(86) PCT No.: PCT/JP99/01742

§ 371 (c)(1),
(2), (4) Date: Dec. 13, 1999

(87) PCT Pub. No.: WO99/53484

PCT Pub. Date: Oct. 21, 1999

(30) Foreign Application Priority Data

Apr. 13, 1998 (JP) ............................................. 10-101519

(51) Int. Cl.$^7$ ................................................. B41J 2/47
(52) U.S. Cl. ...................................... 347/240; 347/251
(58) Field of Search ................................. 347/238, 240, 347/251; 356/71, 303, 319, 320; 235/454, 455, 491; 428/195

(56) References Cited

U.S. PATENT DOCUMENTS 4,202,491 A * 5/1980 Suzuki ......................... 235/491
5,548,106 A * 8/1996 Liang et al. ................. 235/454
5,903,340 A * 5/1999 Lawandy et al. ............. 356/71
6,165,592 A * 12/2000 Berger et al. ................ 428/195

FOREIGN PATENT DOCUMENTS

| JP | 2-94133 | | 4/1990 | |
|---|---|---|---|---|
| JP | 3-258593 | | 11/1991 | |
| JP | 4-37840 | | 2/1992 | |
| JP | 6-111054 | | 4/1994 | |
| JP | 7-258566 | | 10/1995 | |
| JP | 8-22891 A | * | 1/1996 | ........... H05B/33/04 |
| JP | 8-120598 | | 5/1996 | |
| JP | 8-315422 | | 11/1996 | |
| JP | 10-12377 A | * | 1/1998 | ........... H05B/33/10 |

* cited by examiner

Primary Examiner—Hai Pham
(74) Attorney, Agent, or Firm—Harness, Dickey & Pierce, P.L.C.

(57) ABSTRACT

An information recording method for recording desired information, wherein a control circuit (150) identifies a characteristic of light corresponding to information to be recorded, in accordance with table data stored in a table memory (151), indicating a corresponding relationship between the information to be recorded and the wavelength of the light and selects a light emitting material which emits the identified characteristic of the light in response to energy (electricity or light) supplied thereto, and a recording head (110) forms a light emitting element by supplying the light emitting material on a substrate (10) of a recording medium. Furthermore, energy is supplied to the recording medium on which the information is written so that the light emitting material emits light, the characteristic of the light is identified and the information is reproduced in accordance with the identified characteristic. The security of the information is enhanced with a new and easy method of information recording.

17 Claims, 9 Drawing Sheets

Fig. 9

INFORMATION RECORDING METHOD AND INFORMATION REPRODUCING METHOD, RECORDING MEDIUM FOR USE IN THE METHODS, AND INFORMATION RECORDING APPARATUS AND INFORMATION REPRODUCING APPARATUS

TECHNICAL FIELD

The present invention relates to an information recording technique usable in an authentication system or other systems and, more particularly, to a new method of information processing for recording and reproducing information according to the wavelength of light from a light emitting element.

BACKGROUND ART

Conventionally available cardlike recording media include magnetic cards using a magnetic recording technique, IC cards using a semiconductor technique, optical cards using an optical technique, and other similar cards. These recording media are described in "Handbook for Electronics, Information and Communication Engineers", pp. 605, published by the Institute of Electronics, Information, and Communication Engineers of Japan.

For example, the magnetic card has magnetic stripes, and personal information is recorded using the magnetic stripes. The IC card includes an integrated circuit, onto which information is electronically written. In the optical card, pits, which reflect light, are arranged in accordance with information, and thereby information is stored in a bit by bit manner.

In connection with the method of recording information, in the magnetic card, a magnetic material is magnetized in accordance with 1 or 0 of binary data in a manner such that magnetic intensity represents on or off of the bit. In the IC card, binary data is directly written onto an integrated circuit, and the written information is directly read. In the optical card, pits are formed in a light non-reflective layer arranged above a light reflective layer in accordance with 1 or 0 of binary data, and to read them, a laser beam is directed to the pits, thereby reading information responsive to the intensity of the reflected light.

The specifications of the conventional recording medium and the conventional recording method are standardized, and information recording cannot be performed on an individual, low-cost and easy basis. In today's information society, there is a great demand for recording personal information in a diversity of businesses. Information recording is preferably carried out onto any medium, without the need for magnetic recording media working together with computer or standardized cards. The conventional technique keeps individual users from flexibly recording information without any limitation to media.

The security of information is an important concern in today's information society. Security cannot be assured in a method in which an imitator is able to easily read information. There is a great demand for the proposal of a new system for information recording. Since the conventional technique requires, in principle, that information be recorded in a binary code, there is the risk that imitators can easily know the content of information if they read, from a recording medium, a signal corresponding to the information.

Since the amount of information at any given recording point in the binary data is one bit at most, the overall amount of information recordable at a limited number of recording points on the recording medium is not so large. By changing physical constants, such as a wavelength of light, a multi-value recording is performed on a single recording point, and the amount of information recorded onto the recording medium will dramatically increase.

SUMMARY OF THE INVENTION

It is a first object of the present invention to provide a new information recording method, which has not been available, and thus to provide new methods for recording and reproducing information to enhance the security of information.

It is a second object of the present invention to provide a new information reproducing method which reads information from a recording medium, and thus to provide new methods for recording and reproducing information to enhance the security of information.

It is a third object of the present invention to provide an information recording medium for the new information recording and reproducing methods, and thus to enhance the security of information.

It is a fourth object of the present invention to provide an information recording apparatus for carrying out the new information recording and reproducing methods, and thus to allow individual users to easily record security information and the like.

It is a fifth object of the present invention to provide an information reproducing apparatus for carrying out the new information recording and reproducing methods, and thus to enhance the security of information.

Noticing electroluminescence (EL) in which the emission of light results from the application of an electric field and photoluminescence (PL) in which luminescence is stimulated by the irradiation of light having a particular wavelength, the inventors of this invention have proposed a technique to record, read and reproduce information using the wavelength of the light emission of a light emitting element. The light emitting element is easily formed by appropriately selecting the light emitting material and thanks to the rapidly advanced ink jet technique today, the information recording method using the light emitting element serves individual use at a personal level.

To achieve the first object of the present invention, an information recording method for recording desired information onto a recording medium includes 1) the step of identifying a characteristic of light, which corresponds to information to be recorded, in accordance with a corresponding relationship predetermined between specific information and the characteristic of light, 2) the step of selecting a light emitting material that emits the light having the identified characteristic in response to supplied energy, and 3) the step of arranging the selected light emitting material onto a substrate of the recording medium.

The present invention may further include the step of forming a reflective layer for reflecting the light from the light emitting material, prior to or subsequent to the step of discharging the selected light emitting material.

The "characteristic of light" characterizes the property of light by physical constants, and may be anything which is related to information by numerical values, such as the wavelength, frequency, frequency distribution, quantity of light (amplitude of wave). The energy may be anything that stimulates the light emitting element, for example, electricity, light, magnetic field, heat, etc. The light emitting material may be anything that performs a predetermined light emission when supplied with energy. For example, an organic electroluminescence material, an inorganic electroluminescence material, a photoluminescence material or the like may be used. The substrate may be anything that holds the light emitting material thereon. For example, a hard material, such as a bonded glass or ceramic, or a flexible material, such as paper or a plastic film, may be employed. Available as a method for arranging the light emitting material on the substrate is an application method such as a printing method or a roll coating method, or a fluid light emitting material may be applied through an ink jet recording head. The discharging method of discharging the material through the ink jet recording head is preferable as a method for implementing the present invention, because the device for it is simple and easy to control.

To achieve the second object of the present invention, an information reproducing method for reading information from a recording medium, includes 1) the step of emitting light from a light emitting element by supplying energy to a recording medium which includes at least one light emitting element emitting light having a characteristic correspondingly predetermined to specific information,
2) the step of reading the light emitted by the light emitting element,
3) the step of identifying the characteristic of the read light, and
4) the step of identifying unique information indicated by the identified characteristic of the light, in accordance with a corresponding relationship between the identified information and the characteristic of the light.

The information recording method may further include the step of comparing the identified unique information to a set of authentication information pre-registered in a database, and the step of processing the recording medium as being authenticated, when there is present, in the set of authentication information, information identical to the unique information.

To achieve the third object of the present invention, a recording medium includes at least one light emitting element, for information holding, which emits light having a specific characteristic with energy supplied thereto, and includes a light emitting material that emits light having a characteristic corresponding to the unique information to be recorded, in accordance with a corresponding relationship predetermined between specific information and the characteristic of the light.

Preferably, the light emitting element includes a reflective layer for reflecting the light from the light reflecting material, and the reflective layer has an optical resonance structure matching the characteristic of the light emitted by the light emitting material.

For example, the light emitting element may be an electroluminescence element. Preferably, the light emitting element is an organic electroluminescence element, and further includes a hall transport layer. Preferably, the light emitting element is an organic electroluminescence element, and further includes an electron transport layer. The light emitting element may be an element emitting light based on photoluminescence.

To achieve the fourth object of the present invention, an information recording apparatus for recording desired information onto a recording medium, includes 1) a plurality of storage means for storing light emitting materials, which emit lights having respective specific characteristics in response to energy supplied thereto, in accordance with a corresponding relationship between the light emitting material and the specific characteristic,
2) control means for selecting one of the plurality of storage means, and
3) discharging means for discharging, onto a substrate, the light emitting material supplied by the storage means selected by the control means, wherein when the unique information to be recorded is supplied, the control means identifies the characteristic of the light indicating the unique information in accordance with the corresponding relationship predetermined between the specific information and the characteristic of the light and selects the light emitting material emitting the light having the identified characteristic.

The information recording apparatus may include reflective layer forming means for forming a reflective layer reflecting light from the light emitting material, prior to or subsequent to the discharging of the light emitting material.

Preferably, the discharging means is an ink jet recording head, and the information recording apparatus further includes driving means for relatively moving the ink jet recording head with respect to the substrate.

To achieve the fifth object of the present invention, an information reproducing apparatus for reading information from a recording medium, includes 1) energy supplying means which is arranged to supply predetermined energy to a recording medium which includes at least one light emitting element emitting light having a characteristic correspondingly predetermined to specific information,
2) detecting means for detecting the light emitted by the light emitting element in response to the energy,
3) identifying means for identifying the characteristic of the detected light, and
4) processing means for identifying unique information indicated by the identified characteristic of the light in accordance with a corresponding relationship between the identified information and the characteristic of the light.

As the energy supplying means, electrodes that feed a current or an electric field, or a lamp or a laser device, which feeds optical energy, is employed. As the detecting means, an optical fiber or other optical element, which inputs directly the wavelength of light, or a photoelectric conversion device which detects the intensity of light is employed. The identifying means is a spectrometer, a spectrum analyzer, or the like when the characteristic of light is a wavelength, and is level detecting means, such as a peak detector, when the characteristic of light is intensity. The processing means decodes the output signal of the identifying means, and is preferably a microcomputer, or the processing means may be constructed of a decode circuit in hardware.

In the information reproducing apparatus, the energy supplying means is preferably arranged to supply one of electricity and light to the light emitting element as energy.

The information reproducing apparatus further includes a database for storing a set of predetermined authentication information, and the processing means compares the identified unique information to the set of authentication information registered in the database when the unique information is identified, and processes the recording medium as being authenticated when there is present, in the set of authentication information, information identical to the unique information.

BRIEF DESCRIPTION OF THE DRAWINGS

FIG. 1 shows a recording medium of a first embodiment, wherein

FIG. 7 shows the construction and function of a recording medium of the second embodiment, wherein

BEST MODE FOR CARRYING OUT THE INVENTION

The preferred embodiments of the present invention are now discussed, referring to the drawings.

First Embodiment

A first embodiment of the present invention relates to an embodiment to perform information recording by discharging a light emitting material through an ink jet recording head.

(Construction of the Recording Medium)

Figure 1A:
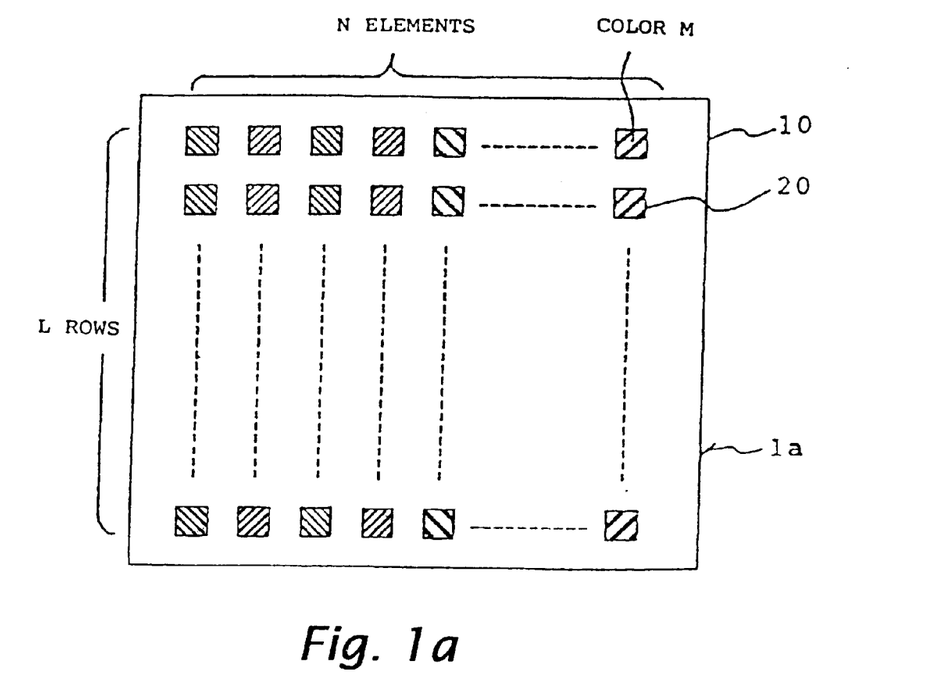
FIG. 1(a) is a plan view of the recording medium and FIG. 1(b) is a side view of the recording medium.
Figure 1B:
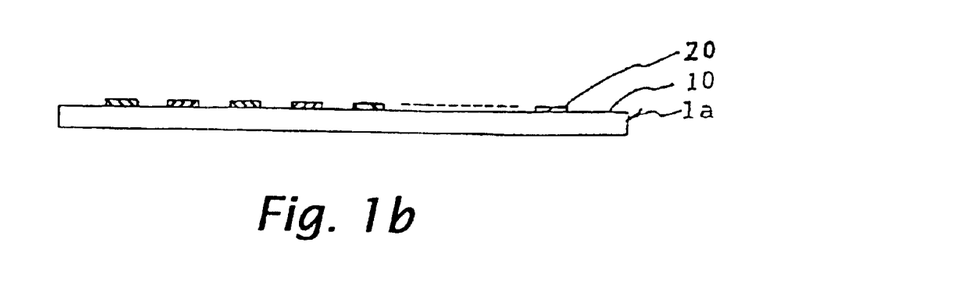

FIG. 1 diagrammatically shows a recording medium 1a used in this embodiment, and FIG. 1(a) is a plan view of the recording medium 1a and FIG. 1(b) is a side view of the recording medium 1a.

Referring to FIG. 1, the recording medium 1a includes a plurality of light emitting elements 20 on a substrate 10. The number of light emitting elements 20 is determined depending on the amount of information the user desires to store. Information recorded onto the recording medium 1a may be authentication information, for example, which is assigned to each recording medium. The shape and area of each light emitting element 20 are appropriately set so as to produce a sufficient quantity of light to reproduce information. Now the colors (wavelengths) selectable as a light emitting element are M colors (M is a natural number), and when a matrix of N rows and N columns of light emitting elements 20 is arranged as shown in FIG. 1(a), the amount of information recognizable is $M^{N \times L}$. Any method of displaying information is acceptable. For example, when one character is represented by a single column of light emitting elements 20, L characters from among $M^N$ characters are selected and recorded. The pitch of the light emitting elements may be as high as an information reproducing apparatus can read.

The material of the substrate 10 has a mechanical strength sufficient to withstand the usage as a recording medium and is a chemically and physically stable material resisting to aging. When light detection is performed from behind the substrate 10, the substrate 10 is constructed of a transparent material, such as glass, quartz, plastic, ceramic, transparent resin, or film.

The light emitting element 20 has a structure of, at least, a single light emitting material layer formed on the substrate 10. An inorganic light emitting material or an organic light emitting material may be employed for the light emitting material. The light emitting material is dissolved in a solvent to be discharged through an ink jet recording head and is then discharged onto the substrate.

The use of the inorganic light emitting material provides the advantage that a light emission state changes very little with temperature. The inorganic light emitting material features a high insulation resistance, has the center of light emission within a desired wavelength range, and is free from impurities and defects hindering light emission. For example, strontium sulfide with rare earth element cerium added is used to emit blue/green light and ZnS:Mn are combined to emit yellow/orange light.

The use of the organic light emitting material provides the advantage that the degree of freedom in selecting the wavelength of the emitted light is large permitting a wide range of wavelength to be selected with specific materials. Selected as the organic light emitting material are the ones having the energy of excitons that corresponds to a difference in energy between the HOMO (the highest occupied molecular orbital) and the LUMO (the lowest unoccupied molecular orbital), corresponding to the forbidden band of the organic material.

A low-molecular material or high-molecular material is selected, and particularly, a conjugated polymer having a conjugated system advanced in its main chain, an electrically conductive polymer, or a pigment molecule is selected.

As for low-molecule organic materials, anthracene, PPCP, $Zn(O_xZ)_2$, distylbenzene (DSB), its derivative (PESB) etc. are used as blue light emitting materials. $Alq_3$, coronene, etc. are used as green light emitting materials. BPPC, perylene, DCM, etc. are used as red light emitting materials.

In connection with high-molecular light emitting materials, PAT are used as a red light emitting material, and MEH-PPV is used as an orange light emitting material, and PDAF, FP-PPP, RO-PPP, PPP, etc. are used as blue light emitting materials. PMPS is used as a violet light emitting material. Also available are PPV, RO-PPV, CN-PPV, $PdPhQ_x$, $PQ_x$, PVK (poly(N-vinyl carbazole)), PPS, PNPS, PBPS, etc. In particular, PVK changes the light wavelength by controlling the content or a discharge rate of a dopant ink of a pigment molecule, such as an Eu complex, having an inferior carrier transport capability. For example, if the light emitting material layer constructed of PVK is doped with a fluorescent pigment, the color of the emitted light is modulated. If the light emitting material layer constructed of PVK is doped with a pigment, such as 1,1,4,4-tetraphenyl-1,3,-butadiene (TPB), coumarin 6, or DCM 1, the color of the emitted light is changed to blue, green and orange. If PVK is doped with the three pigments at the same time, a wide spectrum results. If PPV is doped with rhodamine B or DCM, the light color can be changed within a color range from green to red.

When energy is supplied to the recording medium in the form of electricity, a transparent electrode, working as an anode, is laminated between the substrate 10 and the light emitting material layer. The transparent electrode is constructed of a light-transmissive and electrically conductive material, such as ITO or a highly doped, electrically conductive polymer exhibiting a light transmissivity to the wavelength of the emitted light.

When the organic light emitting material with a low hall transport capability is used, a hall transport layer is preferably arranged between the light emitting material layer and the anode with the light emitting material layer in contact with the hall transport layer. For the hall transport layer, TPD (N,N$^+$-diphenyl-N,N'-(3-methylphenyl)-1,1'-biphenyl-4',4-diamine), etc. having a high hall transport capability is employed. When the light emitting material has a low electron transport capability, an electron transport layer is preferably arranged over the light emitting material layer. For the electron transport layer, TAZ, PBD, Alq$_3$ (8-hydroxyl-quinoline-aluminum), etc., having a high electron transport capability, are employed.

When the anode and the hall transport layer are arranged between the substrate and the light emitting material layer, the anode and the hall transport layer are preferably formed on the substrate prior to the recording operation, and the electron transport layer is supplied together with the light emitting material layer on the substrate, to be laminated on the light emitting material layer during the recording operation. Depending on the detection method of detecting the light from the light emitting element during the information reproduction, the cathode, the electron transport layer, the light emitting material layer, the hall transport layer, and the anode are consecutively laminated from the substrate.

Figure 6:
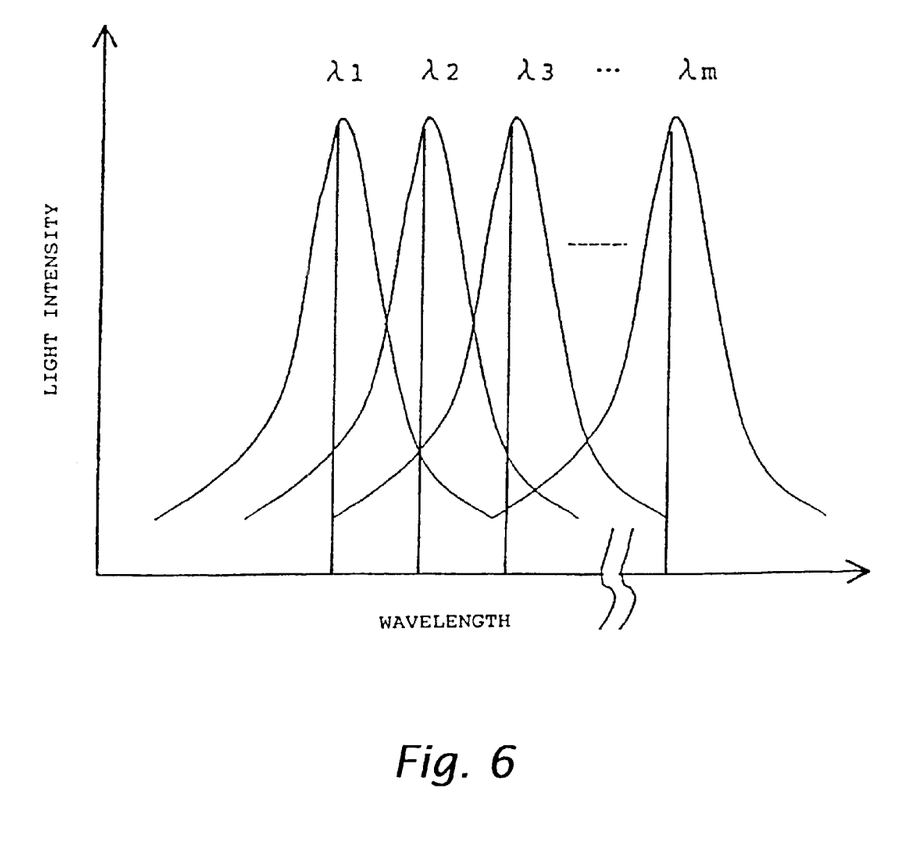
FIG. 6 is a diagram showing a wavelength recording characteristic of a recording medium in the first embodiment.

FIG. 6 shows a wavelength recording characteristic of the recording medium 1a in this embodiment. Referring to FIG. 6, the wavelength changes from one to another, among $\lambda 1$–$\lambda m$ having their respective peaks, as the light emitting material changes. If a spacing between adjacent wavelengths is wide to a certain degree, it can be determined which wavelength is derived from which light emitting material.

(Construction of the Information Recording Apparatus)

Figure 2:
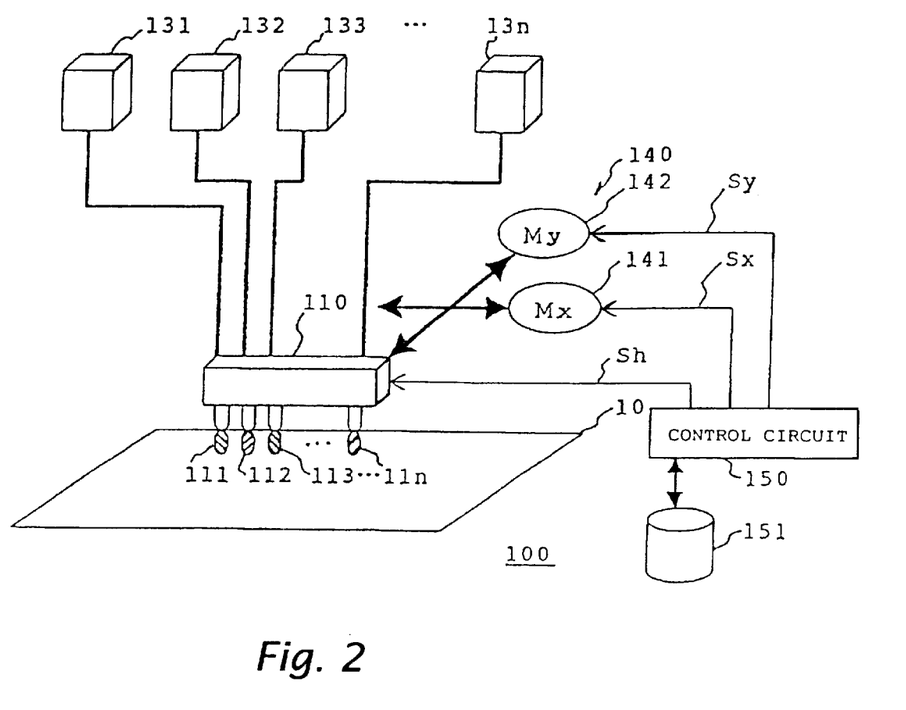
FIG. 2 is a block diagram showing an information recording apparatus of the first embodiment.

FIG. 2 shows the construction of an information recording apparatus 100 of this embodiment.

Referring to FIG. 2, the information recording apparatus 100 includes an ink jet recording head 110, tanks 13x (x is 1, . . . , n), a drive unit, and a control circuit 150.

The ink jet recording head 110 may use any known ink jet method, such as a piezo jet method in which a voltage is applied to a piezoelectric element such as PZT or a method in which ink is discharged by generating a bubble in ink with a heating element. The ink jet recording head 110 includes a plurality of nozzles 111–11n, through which light emitting materials, supplied from different tanks 131–13n, are discharged.

The tanks 131–13n store respective light emitting materials emitting light rays having different light wavelengths, and supply the light emitting materials to the ink jet recording head 110. The tanks 131–13n are connected to the ink jet recording head 110 so that the light emitting materials supplied by the tanks 131–13n are discharged through the nozzles 111–11n.

The drive unit 140 is provided with a motor 141 that relatively moves the ink jet recording head 110 in the X axis direction and a motor 142 that relatively moves the ink jet recording head 110 in the Y axis direction. The drive unit 140 moves the ink jet recording head 110 and/or the substrate 10, thereby relatively moving the ink jet recording head 110 and substrate 10.

The control circuit 150 is a computer, including unshown RAM, ROM, interface circuits, etc., and performs the information recording method (see FIG. 4) of the present invention by executing a predetermined program. The control circuit 150 connects to a table memory 151. The table memory 151 stores table data that correlates information to be recorded and the light wavelength. The corresponding relationship therebetween is similar to the relationship between a character and its character code, but, preferably, the corresponding relationship is uniquely set on each user's own. For the unique corresponding relationship, other persons cannot know it, and the security of information is enhanced. For example, when the settable wavelengths are 4 (=M) colors, four light emitting elements express 256 (=4$^4$) character codes. The same table data is commonly used between the information recording apparatus and the information reproducing apparatus. The table data may represent the corresponding relationship between information and, in the information recording apparatus, the tank and the light emitting material, rather than the corresponding relationship between information and the wavelength.

To dope the light emitting material with a pigment, a solvent containing PVK and a solvent containing the pigment are stored in respective tanks, mixed at a mixing ratio controlled by the control circuit, and discharged at a discharge rate controlled by the control circuit in the information recording apparatus.

When the organic electroluminescence element or the like is employed as the light emitting element and when the electron transport layer or the electron transport layer is used along with the light emitting material layer, these layers may be supplied together with the light emitting material layer in the information recording process. In this case, however, a head for supplying a material for these layers and a tank, connected to the head and filled with the material for these layers, are arranged.

(Construction of the Information Reproducing Apparatus)

Figure 3:
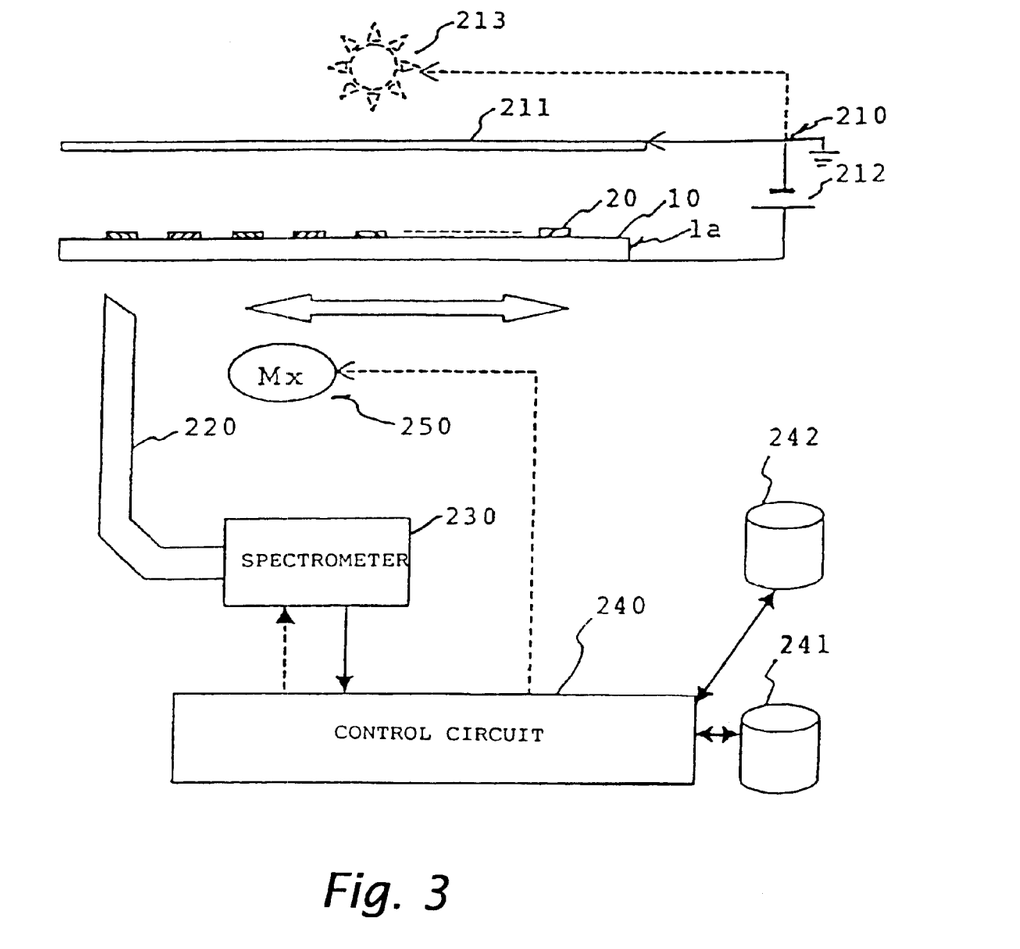
FIG. 3 is a block diagram showing an information reproducing apparatus of the first embodiment.

FIG. 3 shows the construction of an information reproducing apparatus 200 of this embodiment.

Referring to FIG. 3, the information reproducing apparatus 200 includes an energy supplying mechanism 210, an optical fiber 220, a spectrometer 230, a control circuit 240, and a drive unit 250. With the recording medium 1a loaded, the information reproducing apparatus 200 reads information from the light emitting elements 20.

The energy supplying mechanism 210 is arranged in accordance with the type of energy to be supplied to the recording medium 1a. When a mechanism for emitting light by applying an electrical field to the light emitting layer is arranged with the transparent electrode working as an anode formed on the recording medium, the energy supplying mechanism 210 is provided with an electrode 211 as a cathode and a power source 212. The positive side of the power source 212 is connected to the transparent electrode of the recording medium 1a, and the negative side of the power source 212 is connected to the electrode 211 as the cathode. The recording medium 1a is detachably loaded in the information reproducing apparatus 200, and the information reproducing apparatus 200 has an unshown connection mechanism to electrically connect the power source to the transparent electrode with the recording medium 1a loaded.

When a mechanism for supplying light as energy to the light emitting material layer of the recording medium is employed, the energy supplying mechanism 210 is provided with the power source 212 and an illuminating unit 213. The illuminating unit 2B is designed to project light, such as ultraviolet light, to the light emitting elements 20 on the recording medium 1a to excite the light emitting material.

The optical fiber 220 picks up light from a light emitting element 20 on the recording medium 1a through the drive unit 250, and feeds the light to the spectrometer 230.

The spectrometer 230 is designed to detect the wavelength of the light fed from the light emitting element 20 by the optical fiber 220, and incorporates a diversity of known techniques. For example, the spectrometer 230 may be of a prism type including a prism, a collimator mirror, and a slit, of a diffraction grating type including a slit, a spherical mirror, and a diffraction grating, or of an interference type that generates an interference pattern based on the interference of light.

The control circuit 240 is a computer, including unshown RAM, ROM, interface circuits, and performs the information reproducing method (see FIG. 5) of the present invention by executing a predetermined program. The control circuit 240 includes a table memory 241 and a database 242. The table memory 241 is designed to store table data identical to that stored in the table memory 151 in the information recording apparatus 100. The database 242 stores the authentication information of the recording medium. The authentication information is pre-registered, as the information to be recorded onto the recording medium 1a, in the information reproducing apparatus.

The drive unit 250 is provided with motors to move the optical fiber 220 in any direction and to receive light from any light emitting element 20.

If it detects a wavelength of light as the characteristic of the light, any means may be employed as the light detecting means instead of the optical fiber, for example, means, which is resonant at a particular wavelength and outputs a detected signal, may be employed. As the identifying means for identifying the wavelength, an apparatus, such as a spectrum analyzer, capable of detecting the frequency and wavelength of light, may be employed, instead of the spectrometer.

When the intensity of light is detected as the characteristic of the light, a photoelectric conversion device, such as a photodiode or phototransistor, may be employed as the light detecting means. Available as the identifying means for identifying the light intensity may be a peak detector or in an alternative arrangement, a detected signal is analog-to-digital converted and the level of the digital signal is then directly read by the control circuit.

(Operation of the Information Recording)

Figure 4:
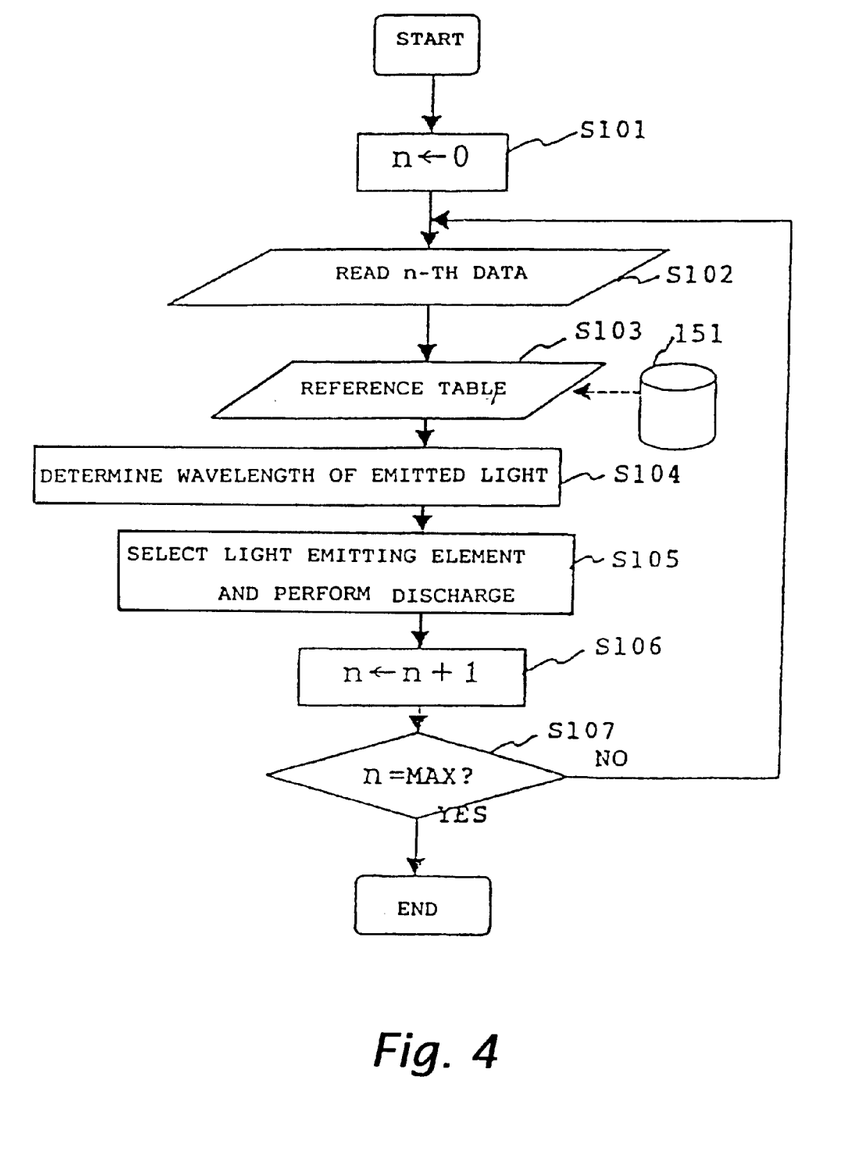
FIG. 4 is a flow diagram showing an information recording method of the first embodiment.

FIG. 4 shows the process of the information recording by the information recording apparatus 100 shown in FIG. 2. Prior to the process, the substrate 10 is now loaded in the information recording apparatus 100. The information to be recorded is beforehand stored in RAM.

A count n, indicating the number of data of the information to be recorded, is reset (n=0) (S101). Here, data is based on the unit of information recordable on a single light emitting element. The information to be recorded includes at least a single piece of data. The control circuit 150 reads n-th data, among the information to be read, from RAM (S102). The table memory 151 is sought in accordance with the read data (S103), and the light wavelength assigned to the data is identified (S104). When the table data indicates the corresponding relationship between the information and the tank and the light emitting material, the tank number and the light emitting material number are identified. The control circuit 150 controls the drive unit 140 to relatively move the ink jet recording head 110 to a location where a light emitting element is to be formed on the substrate. The control circuit 150 controls the piezoelectric body in the ink jet recording head 110 to discharge the light emitting material emitting a light having a designated wavelength, and then discharges the light emitting material having the designated wavelength onto the substrate 10 (S105). When one light emitting element 20 is formed, the control circuit 105 increments the count n by 1 (S106). When there remains data (S107; NO), the formation of light emitting elements in accordance with the next data is performed (S102–S106).

When energy is applied in the form of electric field to the light emitting element, the transparent electrode is beforehand formed on the substrate 10. ITO is used for the transparent electrode, and is formed using a deposition technique, for example. When the hall transport layer is employed, it may be laminated on the transparent layer.

When all information is recorded on the substrate in accordance with the above process, the formation of the recording medium 1a is completed. The recording medium 1a may be carried by a particular user as an ID card, for example.

(Operation of the Information Reproducing Apparatus)

Figure 5:
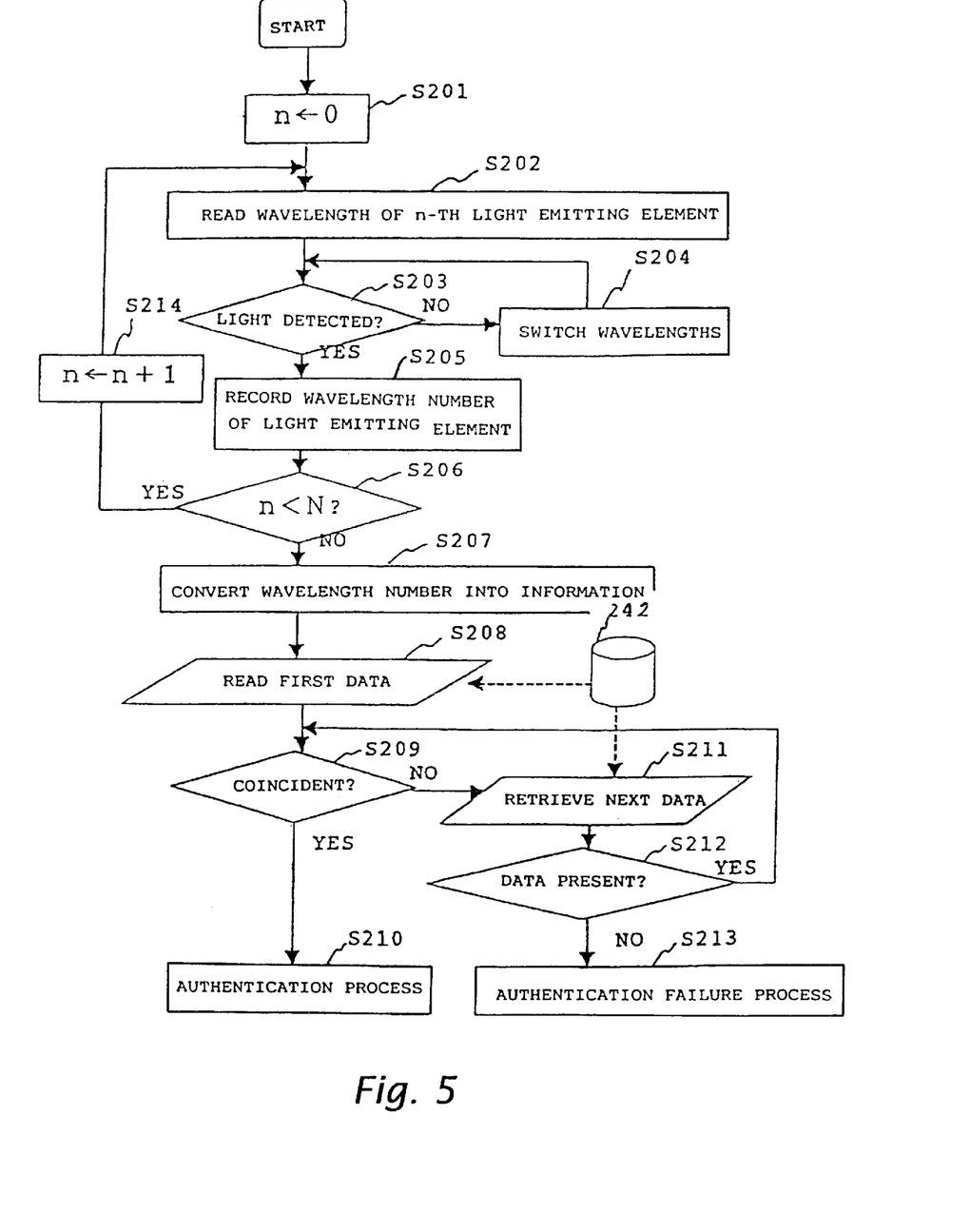
FIG. 5 is a flow diagram showing an information reproducing method of the first embodiment.

The process of reading and authenticating the information from the recording medium, on which the information is written in the information reproducing apparatus 200 shown in FIG. 3, is now discussed, referring to FIG. 5.

A user, who wants the recording medium 1a to be subjected to the authentication process, loads the recording medium 1a into the information reproducing apparatus 200. The user then switches on the information reproducing apparatus 200. To apply energy to the light emitting elements in the form of electric field, the power source 212 is electrically connected to the electrode of the recording medium 1a.

The control circuit 240 in the information reproducing apparatus 200 resets the count n (S201), and reads information from the light from an n-th light emitting element (S202).

Specifically, the control circuit 240 controls the drive unit 250 to move the end of the optical fiber 220 to a location where the light from the n-th light emitting element can be picked up. The spectrometer 230 is operated at a wavelength $\lambda$ of a plurality of wavelengths (=M) (namely, one of $\lambda1$–$\lambda m$ shown in FIG. 6), and checks to see if the light is detected. When the light is detected, the input light must be equal to the wavelength $\lambda$ set in the spectrometer 230. When no light is detected (S203; NO), the wavelength the spectrometer 230 is set to detect is changed to another wavelength (S204), and checks to see if any light is detected (S203). When any light is detected (S203; YES), that wavelength $\lambda$ is recorded as the wavelength of that light emitting element. The wavelength is identified according to a wavelength value or a predetermined assigned number. This completes the process of wavelength detection of a single light emitting element. When the count n has yet to reach a maximum number N (S206; YES), the count n is incremented by 1 (S214), and the spectrometer 230 detects the wavelength of the next light emitting element (S202–S205).

When the light wavelengths of all light emitting elements are identified (S206;NO), the wavelength numbers identified are converted into information in accordance with the corresponding relationship specified by the table data stored in the table memory 241 (S207).

This completes the reproducing process. To simply reproduce information, the process steps subsequent to step S208 may be modified in accordance with the content of the information reproduction. In this embodiment, the authentication process is carried out based on the information reproduced.

The processing circuit 240 for carrying out the authentication process searches to see if there is authentication information in the database 242 identical to the information converted in step S207. Specifically, the control circuit 240 reads first data in the database 242 (S208), and compares it to the converted information for coincidence (S209). When both data coincide with each other (S209; YES), the recording medium 1a is treated as authenticated (S210). When both data fail to coincide with each other (S209; NO), the next data is read from the database 242 (S211). When the next data is present (S212; YES), the converted information is compared to the data read from the database (S209). That data is no longer present (S212; NO) means that the database has no data pre-registered which coincides with the converted information, and an authentication failure process is carried out (S213).

As discussed above, in accordance with the first embodiment, the ink jet recording head easily records information by means of the light emitting element. Since commercially available printers are typically equipped with an ink jet recording head, individual users can freely carry out information recording. Specifically, a flexible substrate working with a commercially available printer is used, a light emitting material emitting a light having a wavelength different from those colors of YCMBk is used, and tanks (cartridges) are identified by color numbers assigned thereto. The printer is connected to a computer that performs the information recording method of this embodiment to carry out "printing". The recording medium is thus produced using a commercially available printer.

In accordance with this embodiment, with M increased above greater than 2, a single light emitting element expresses information ($=M^N$) which is greater than that handled by the conventional binary code. Since the corresponding relationship between information and the wavelength is arbitrarily set to the user's own preference, other persons have difficulty imitating the corresponding relationship, and the security of information is thus enhanced.

Second Embodiment

A second embodiment of the present invention relates to a recording medium having an optical resonance structure and a reading apparatus for reading the recording medium.
(Construction of the Recording Medium)

Figure 7A:
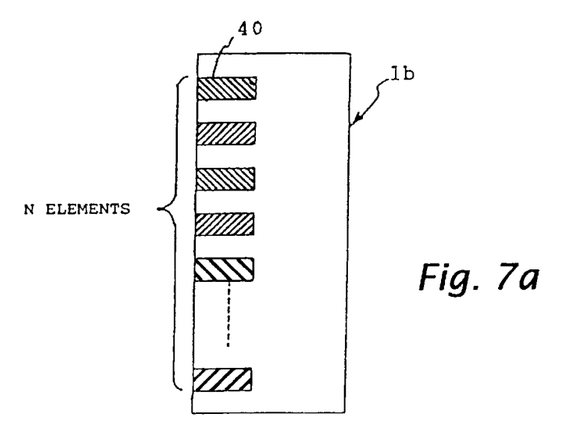
FIG. 7(a) is a plan view of the recording medium.
Figure 7B:
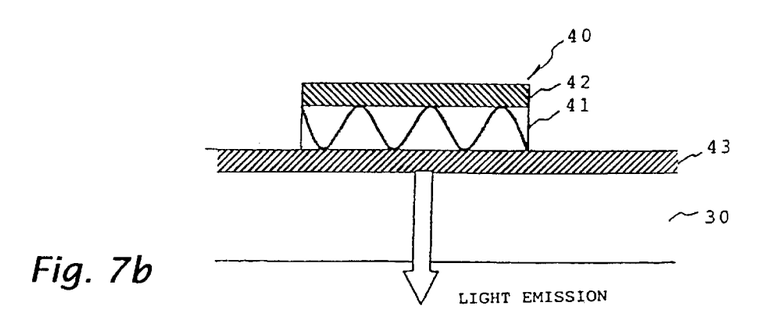
FIG. 7(b) is a side view of the recording medium.
Figure 7C:
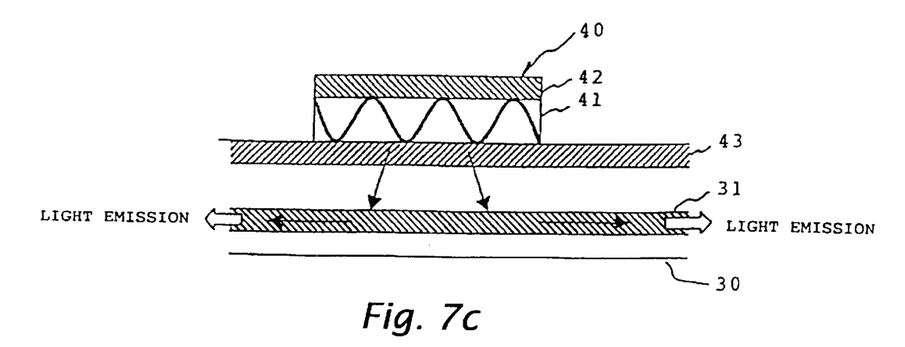
FIG. 7(c) is a side view of a modification of the recording medium.

FIG. 7 shows a recording medium 1b of this embodiment, wherein FIG. 7(a) is a plan view of the recording medium 1b and FIG. 7(b) is a side view of the recording medium 1b. FIG. 7(c) is a modification of the recording medium 1b.

Referring to FIG. 7, the recording medium 1b includes a plurality of recording elements 40 on a substrate 30. The number of light emitting elements 40 is determined depending on the amount of information the user desires to store. The shape and area of each light emitting element 40 are appropriately set so as to produce a sufficient quantity of light to reproduce information. Now the colors (wavelengths) selectable as a light emitting element are M colors (M is a natural number), and when N light emitting elements 20 are arranged as shown in FIG. 7(a), the amount of information recognizable is $M^N$.

The material of the substrate 30 has a mechanical strength sufficient to withstand the usage as a recording medium and is a chemically and physically stable material resistant to aging.

The light emitting element 40 has an optical resonance structure in which a light emitting material layer is sandwiched between reflective layers having different refractive indexes. When light emission is driven by optical excitation (when an illuminating unit 313 is used in FIG. 7 in a reproducing operation in a reproducing apparatus shown in FIG. 8 as will be discussed later), a reflective layer 42 is not needed. The reflective layer 42 and reflective layer 43 may be formed in a dielectric multi-layered structure. The multi-layered structure is formed by laminating a plurality of films, such as of $ZrO_2$, $SiO_2$, $TiO_2$, ITO and the like, having different refractive indexes, with the thickness of each layer properly adjusted. When light emission is driven by electrical excitation (when a cathode 311 is used in FIG. 7 in a reproducing operation in a reproducing apparatus shown in FIG. 8 as will be discussed later), the reflective layer 42 is formed of metals such as Al:Li, Mg:Ag, or Ca:Al. The reflective layer 43 has a dielectric multi-layered structure, with a transparent electrode, such as ITO, laminated thereon. In an optical resonance structure constructed of the metal electrode and the dielectric multi-layered films, the distance between the metal electrode and the dielectric multi-layered film is set so that an optical distance of surfaces between which light reflection occurs is an integer multiple of half the wavelength of the light propagating through the medium filling the spacing between the two surfaces.

One of the diversity of materials described in connection with the first embodiment may be used for the light emitting material layer 41. Any layer may be formed of a material that is discharged through the ink jet recording head.

With the above arrangement, as shown in FIG. 7(b), the light emitting material layer 41 emits light in response to energy supplied thereto, and the light is emitted toward the opposite side through the substrate 30.

According to "Nature, Vol. 389, Sep. 25, 1997, pp 362–364", light is emitted from an end surface through pumping by a laser beam in a laminate structure in which $Alq_3$ and DCM are mixed at a predetermined mixing ratio and grown on an InP coated, silicon oxide layer. Specifically, as a modification of the light emitting element 40, a waveguide layer 31 having a high refractive index, may be formed of the above materials on the substrate 30 as shown in FIG. 7(c). If the mixing ratio of $Alq_3$ and DCM is changed, the light color can be changed from green to red. If a light emitting material layer, formed of $Alq_3$ and DCM, is sandwiched between $Alq_3$, the quantity of emitted light is increased. When the light emitting material layer 41 emits light in response to supplied energy with this arrangement as shown in FIG. 7(c), the waveguide 31 guides the light and allows the light to emit from the end surface of the substrate 30.
(Construction of the Information Reproducing Apparatus)

Figure 8:
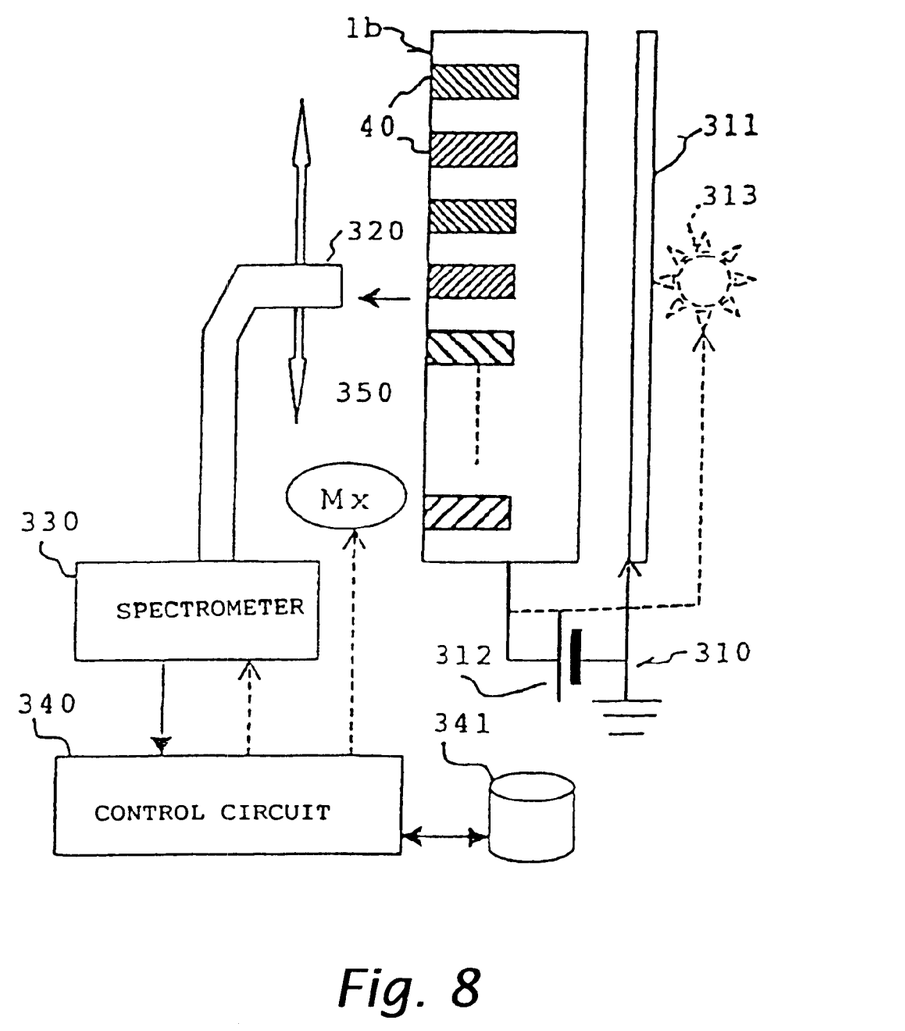
FIG. 8 is a block diagram showing an information reproducing apparatus of the second embodiment.

FIG. 8 shows the construction of an information reproducing apparatus 300 of this embodiment.

Referring to FIG. 8, the information reproducing apparatus 300 includes an energy supplying mechanism 310, an optical fiber 320, a spectrometer 330, a control circuit 340, and a drive unit 350. The information reproducing apparatus 300 is designed to receive the recording medium 1b to read information from the end surface of the light emitting element 40.

The energy supplying mechanism 310 is arranged in accordance with the type of energy to be supplied to the recording medium 1b. When a mechanism for emitting light by applying an electric field to the light emitting material layer is employed, the energy supplying mechanism 310 is provided with an electrode 311 as a cathode and a power source 312. The positive side of the power source 312 is connected to the reflective layer 43 of the recording medium 1b, and the negative side of the power source 312 is connected to the electrode 311 as the cathode. The recording medium 1b is detachably loaded in the information reproducing apparatus 300, and the information reproducing apparatus 300 has an unshown connection mechanism to electrically connect the power source to the electrodes with the recording medium 1b loaded.

When a mechanism for applying light as energy to the light emitting material layer of the recording medium is employed, the energy supplying mechanism 310 is provided with the power source 312 and an illuminating unit 313. The illuminating unit 313 is designed to project light to cause excitation on the light emitting element 40 on the recording medium 1b. The optical fiber 320 picks up light from a light emitting element 40 on the recording medium 1b through the drive unit 350, and feeds the light to the spectrometer 330.

The spectrometer 330 has a construction identical to that of the spectrometer 230.

The control circuit 340 is a computer, including unshown RAM, ROM, interface circuits, and performs the information reproducing method (see FIG. 5) of the present invention by executing a predetermined program. A table memory 341 has a construction identical to that of the table memory 241 of the first embodiment. To allow the information reproducing apparatus 300 to perform the authentication process, a database may further be included.

In the method of recording information to the recording medium, the information recording apparatus, equipped with the ink jet recording head, may be used as in the first embodiment, but a deposition technique may be used in production.

In the method for reproducing information from the recording medium 1b, the same sequence as that in the first embodiment shown in FIG. 5 may be performed.

Figure 9:
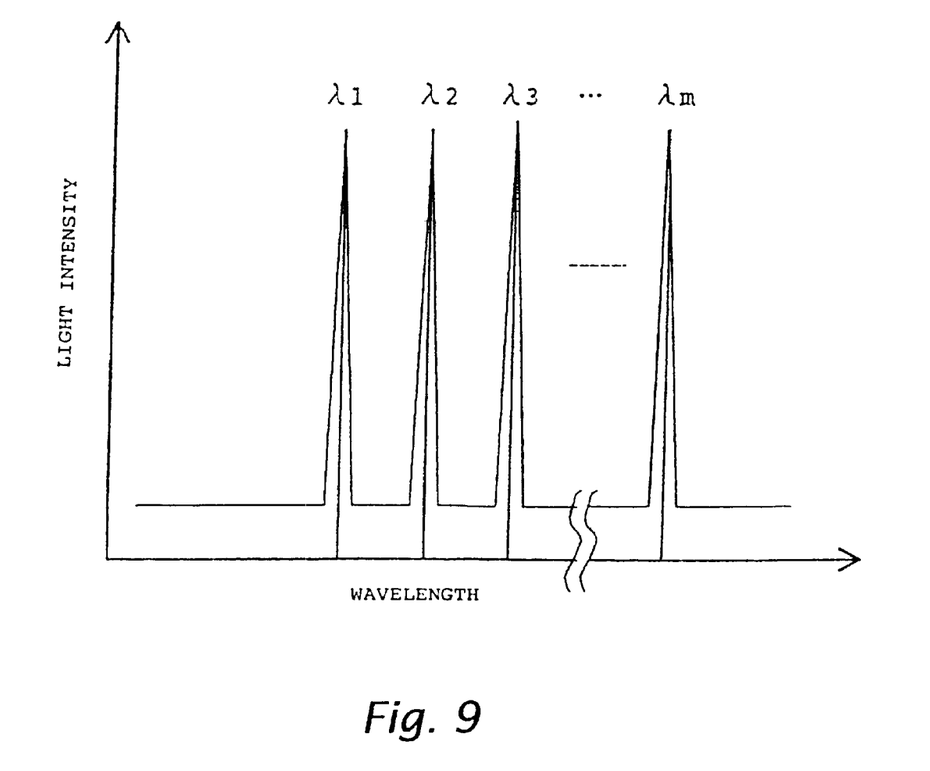
FIG. 9 is a diagram showing a wavelength recording characteristic of the recording medium of the second embodiment.

When the electric field or light is applied to the recording medium 1b in the second embodiment, optical resonance takes place within the reflective plates, and light having a narrow band spectrum is obtained from an end surface of the recording medium. The spectra of the light emitting elements are as narrow as shown in FIG. 9. For example, when a difference between two adjacent wavelengths is 50 nm or so, the number of light colors M settable in the light emitting elements is 5, but if the spectrum is narrowed, the difference between the adjacent wavelengths is set to be 10 nm or so, and the number of light colors M settable becomes 25.

In accordance with the second embodiment, the spectrometer distinctly discriminates between the wavelengths even if the wavelengths of lights set in the light emitting elements are narrowly arranged. Since multiple wavelengths are set in a single light emitting element, a great deal of information is thus recorded.

(Other Modifications)

The present invention is not limited to the above embodiments, and a variety of modifications and changes are possible within the scope of the present invention. For example, the composition and construction of the light emitting element are not limited to the above embodiments, and may be changed. The characteristic of the light may be the frequency of the light rather than the wavelength of the light. The light quantity detectable may be changed from wavelength to wavelength. If information is recorded as a light emitting element, correlated with the characteristic of each light, the method falls within the scope of the present invention regardless of the detection method and physical quantity employed.

If dielectric layers having different refractive indexes and a light emitting material layer are laminated, the spectrum of the light is narrowed. The dielectric layers and the light emitting material layer may be formed through the discharging through the ink jet recording head.

Instead of the spectrometer in the information reproducing apparatus, a plurality of photodetectors, capable of detecting specific wavelengths, may be arranged in accordance with wavelengths to be recognized. The wavelengths of the lights are determined referring to which photodetector outputs a detected signal at a constant level.

Since the present invention presents new methods, which have not been available, for recording information and for reproducing information using the light emitting element, the security of information in today's information society is enhanced. A great deal of information is recorded in a small space, because the amount of information recordable on a single light emitting element is not limited to on and off data.

Since the light emitting element presents a recording medium for recording information in accordance with the present invention, the security of information is enhanced in today's information society. The use of the optical resonance structure narrows the spectrum of the emitted light, permitting a great deal of information to be accurately recorded.

Since the present invention provides the information recording apparatus that employs the ink jet method for forming the light emitting element, individuals can easily record security information.

Since the present invention provides the information reproducing apparatus that retrieves information from the wavelength of light from the light emitting diode, the security of information is enhanced in the information society.

Industrial Applicability

The information processing technique of this invention is expected to find widespread use in portable information media, such as ID cards, of which a high degree of security is required, and the recording, authentication and reproducing of information on the information media.

What is claimed is:

1. An information recording method for recording desired information onto a recording medium, the method comprising:

the step of identifying one or more characteristics of light which corresponds to information to be recorded, where different light characteristics correlate to different characters, the step of selecting one or more light emitting materials that emit the light having the identified characteristics in response to supplied energy, and the step of arranging a plurality of light emitting materials onto a substrate of the recording medium, wherein an ink jet method is employed to supply the light emitting material onto the substrate and the plurality of light emitting materials are spatially separated from each other and form a matrix of light emitting materials having a plurality of rows and a plurality of columns.

2. An information recording method according to claim 1, further comprising the step of forming a reflective layer for reflecting the light from the light emitting material, prior to or subsequent to the step of arranging the light emitting material.

3. The information recording method of claim 1 wherein one or more light characteristics correlates to a particular alphanumeric character.

4. An information reproducing method for reading information from a recording medium, the method comprising:

the step of supplying energy to the recording medium which includes a plurality of light emitting elements that are spatially separate from each other and form a matrix of light emitting materials having a plurality of rows and a plurality of columns, such that each light emitting element emits light having a characteristic that correlates to a character, the step of reading the light emitted by each of the light emitting elements, the step of identifying the characteristic of the read light from each of the light emitting elements, and the step of identifying the alphanumeric characters indicated by the identified characteristics of the light from the plurality of light emitting elements.

5. An information reproducing method according to claim 4, further comprising the step of comparing the identified unique information to a set of authentication information pre-registered in a database, and the step of processing the recording medium as being authenticated when there is present, in the set of authentication information, information identical to the unique information.

6. An information reproducing method according to claim 4, wherein the energy supplied to the recording medium is electrical energy.

7. An information reproducing method according to claim 4, wherein the energy supplied to the recording medium is optical energy.

8. An information reproducing method according to claim 4, wherein the wavelength of the light is identified in the step of identifying the characteristic of the light.

9. An information reproducing method according to claim 4, wherein the intensity of the light is identified in the step of identifying the characteristic of the light.

10. An information recording apparatus for recording desired information onto a recording medium, the apparatus comprising:

a plurality of light emitting material storage devices, wherein each light emitting material storage device is operable to supply a light emitting material which emits light having specific characteristics in response to energy supplied thereto, where different light characteristics correlate to different characters, a controller for selecting one of the plurality of storage devices, and a discharger for discharging onto a substrate a plurality of light emitting materials that are spatially separated from each other and form a matrix of light emitting materials having a plurality of rows and a plurality of columns, the plurality of light emitting materials supplied by the storage devices as selected by the controller, wherein when the desired information to be recorded is supplied, the controller identifies the characteristics of light indicating the desired information, and selects the light emitting material emitting the light having the identified characteristics.

11. An information recording apparatus according to claim 10, further comprising reflective layer forming device for forming a reflective layer reflecting light from the light emitting material, prior to or subsequent to the discharging of the light emitting material.

12. An information recording apparatus according to claim 10, wherein the discharger is an ink jet recording head, and the information recording apparatus further comprises a driver for relatively moving the ink jet recording head with respect to the substrate.

13. An information reproducing apparatus for reading information from a recording medium, the apparatus comprising:

an energy supplier which is arranged to supply predetermined energy to the recording medium which includes a plurality of light emitting elements that are spatially separate from each other and form a matrix of light emitting materials having a plurality of rows and a plurality of columns, such that each light emitting element emits light having a characteristic that correlates to a character, a detector means for detecting the light emitted by each of the light emitting elements in response to the energy, an identifier for identifying the characteristic of the detected light from each of the light emitting elements, and a processor for identifying the alphanumeric characters indicated by the identified characteristics from the plurality light emitting elements.

14. An information reproducing apparatus according to claim 13, wherein the energy supplier is arranged to supply electrical energy as the energy.

15. An information reproducing apparatus according to claim 13, wherein the energy supplier is arranged to supply optical energy as the energy.

16. An information reproducing apparatus according to claim 13, further comprising a database for storing a set of predetermined authentication information, wherein the processor compares the identified unique information to the set of authentication information registered in the database when the unique information is identified, and processes the recording medium as being authenticated when there is present, in the set of authentication information, information identical to the unique information.

17. An information recording method for recording desired information onto a recording medium, the method comprising:

the step of identifying one or more characteristics of light which corresponds to information to be recorded, where different light characteristics correlate to different characteristics, the step of selecting one or more light emitting materials that emit the light having the identified characteristics in response to supplied energy, and the step of arranging a plurality of light emitting materials onto a substrate of the recording medium, wherein the plurality of light emitting materials are spatially separated from each other and form a matrix of light emitting materials having a plurality of rows and a plurality of columns.

* * * * *

UNITED STATES PATENT AND TRADEMARK OFFICE
CERTIFICATE OF CORRECTION

PATENT NO. : 6,563,527 B1
DATED : May 13, 2003
INVENTOR(S) : Shimoda et al.

It is certified that error appears in the above-identified patent and that said Letters Patent is hereby corrected as shown below:

Column 5,
Line 56, "N rows" should be -- L rows --;

Column 7,
Line 6, "$N^+$" should be -- N' --.

Signed and Sealed this

Ninth Day of December, 2003

JAMES E. ROGAN
*Director of the United States Patent and Trademark Office*